F. A. RAY.
POWER GENERATOR.
APPLICATION FILED JUNE 29, 1908.
1,164,960.
Patented Dec. 21, 1915.
6 SHEETS—SHEET 5.
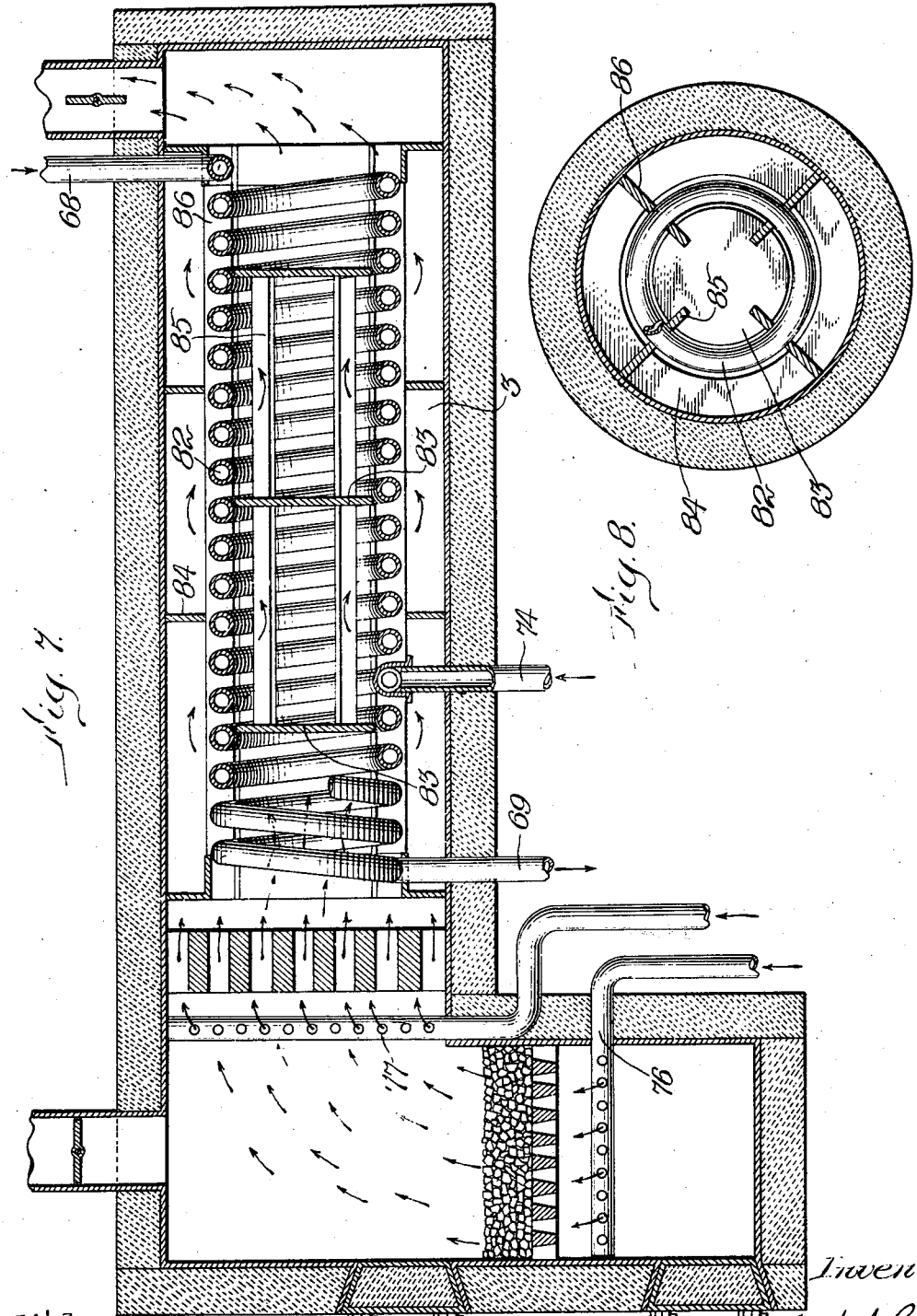

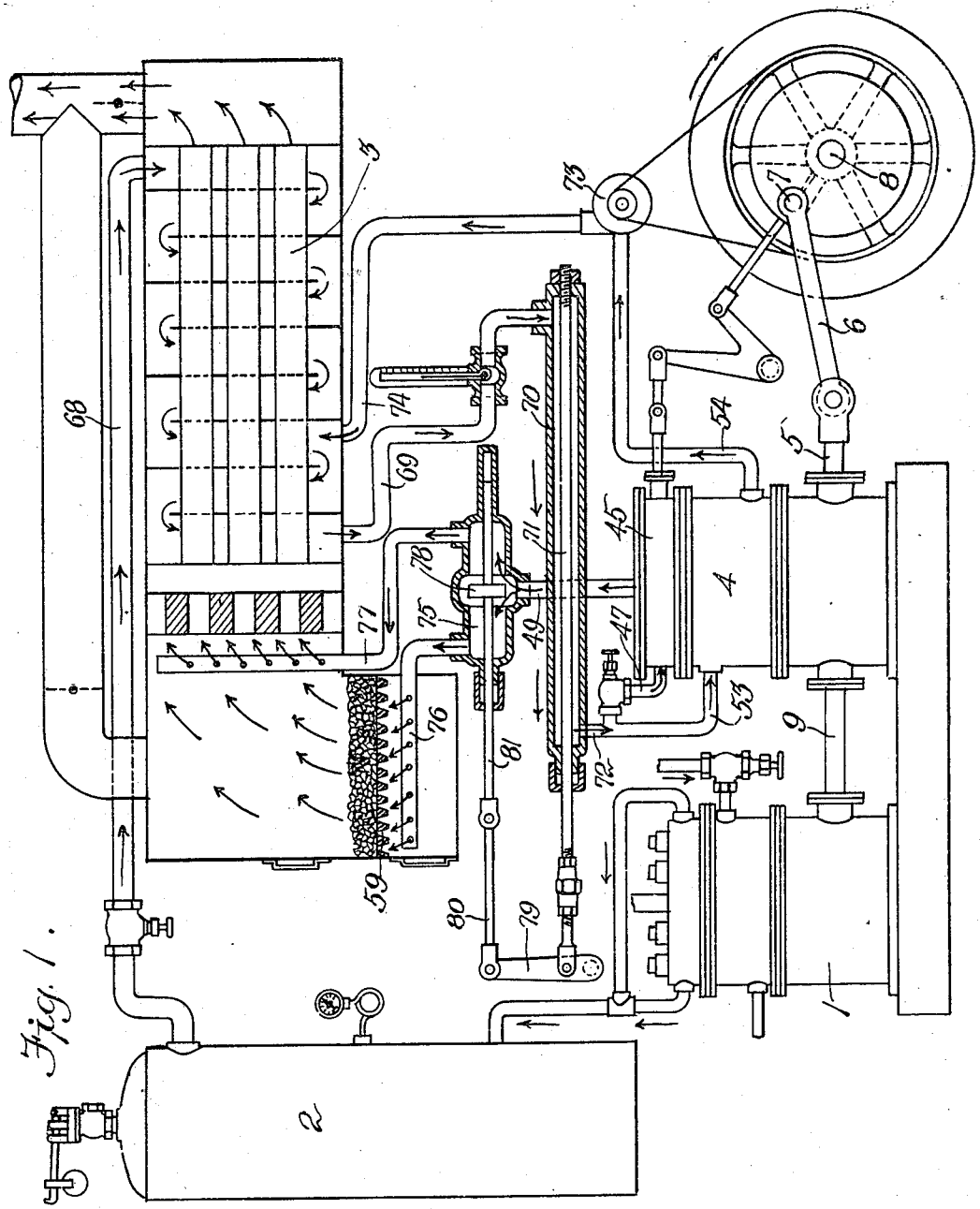

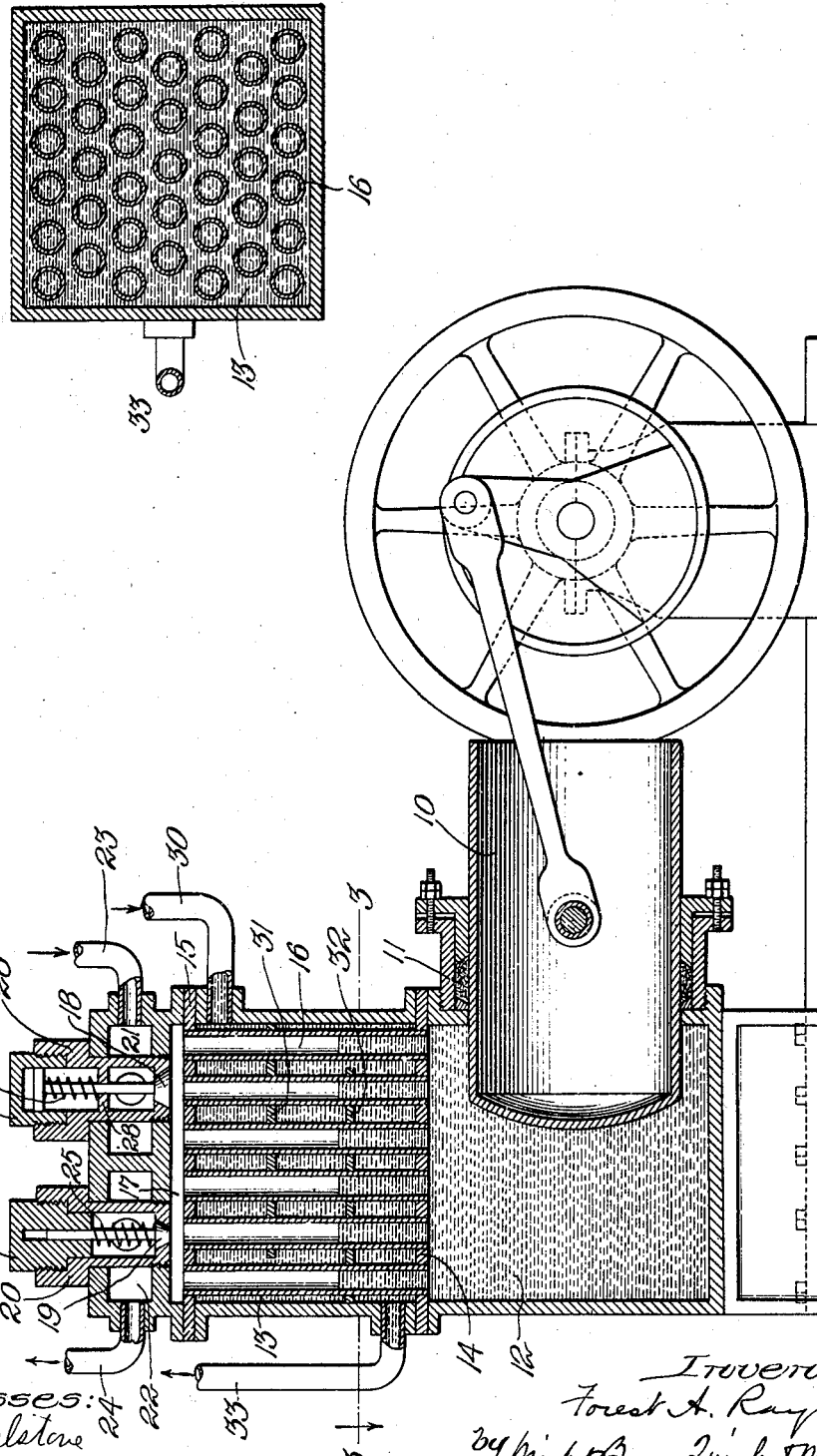

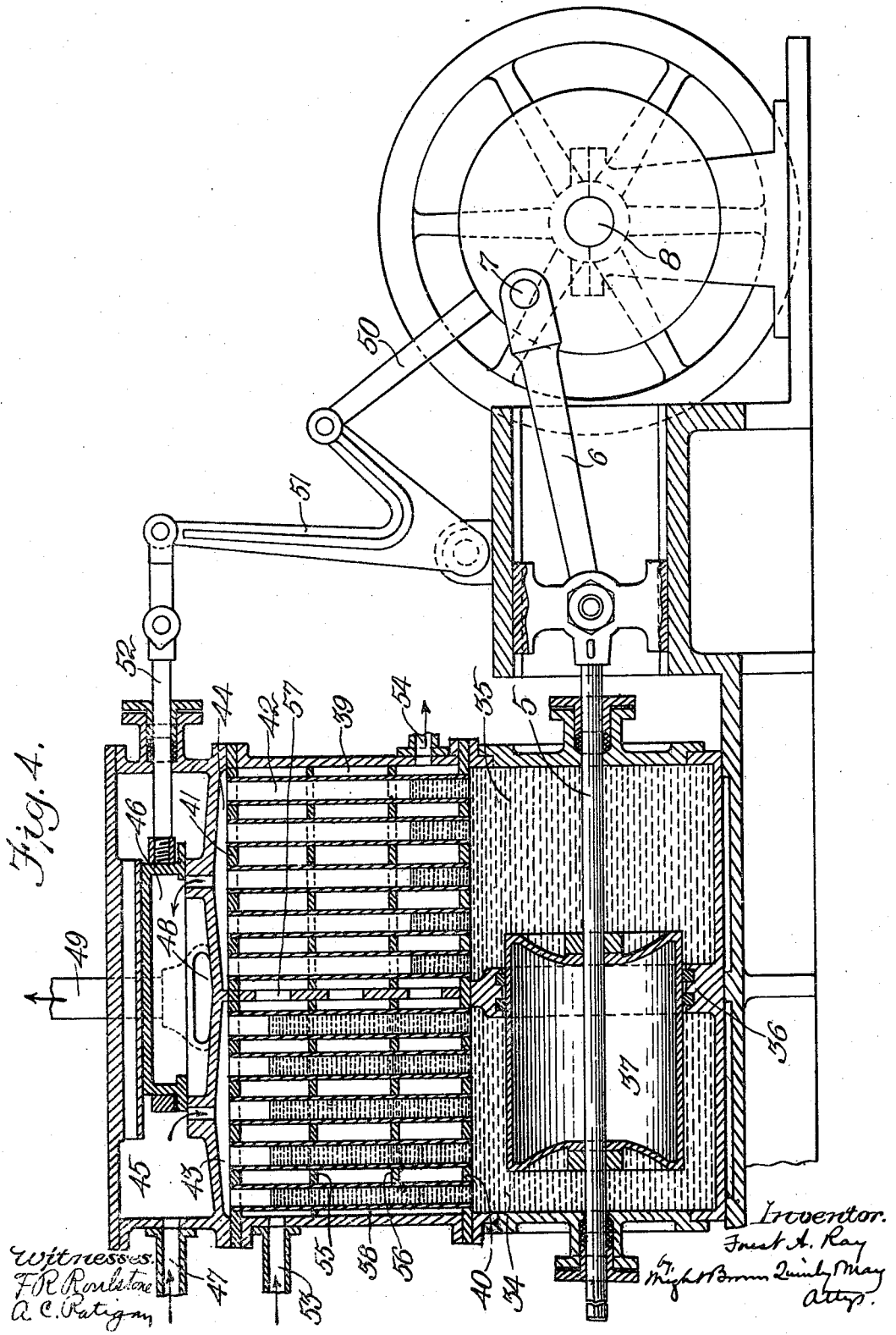

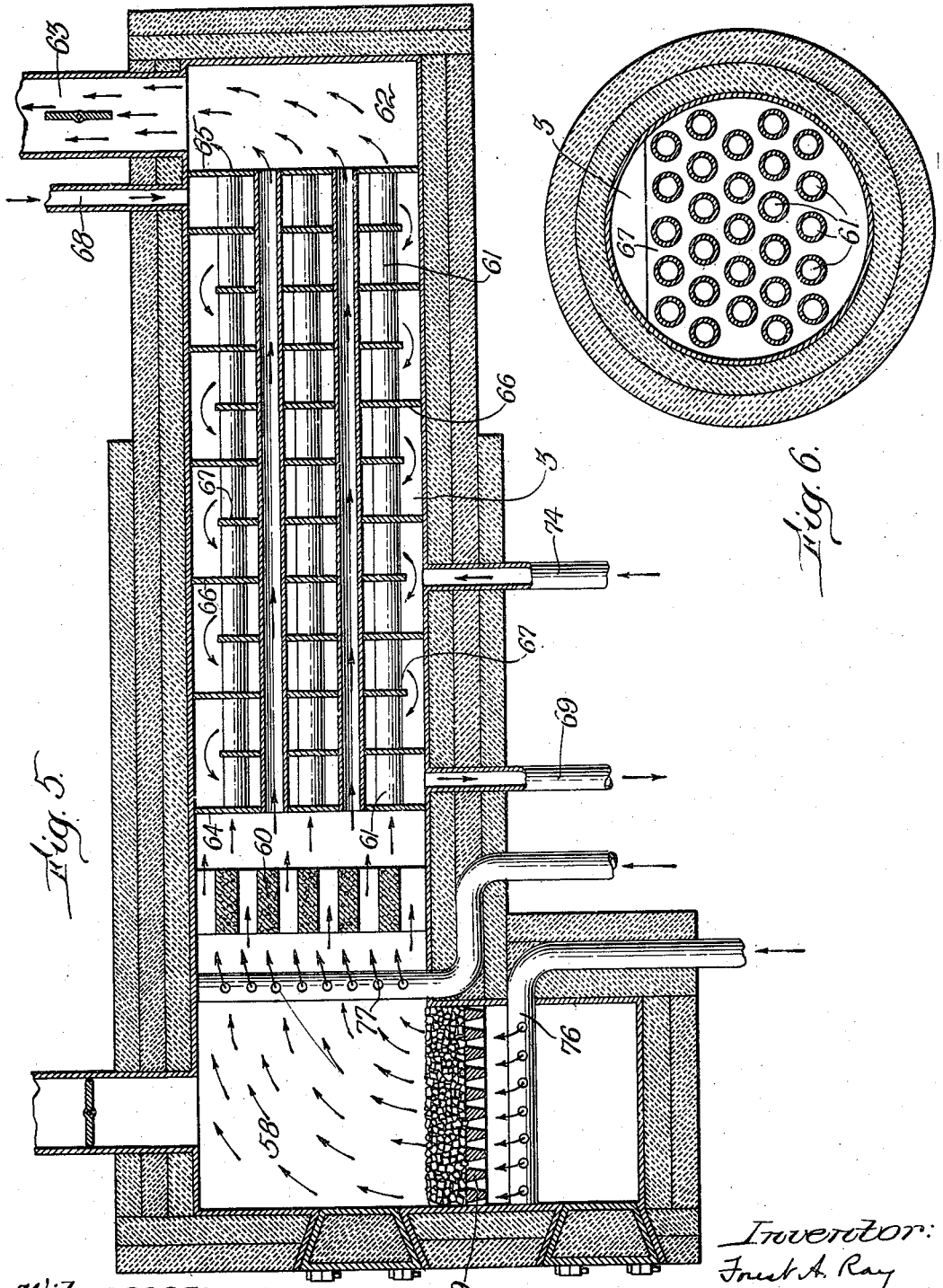

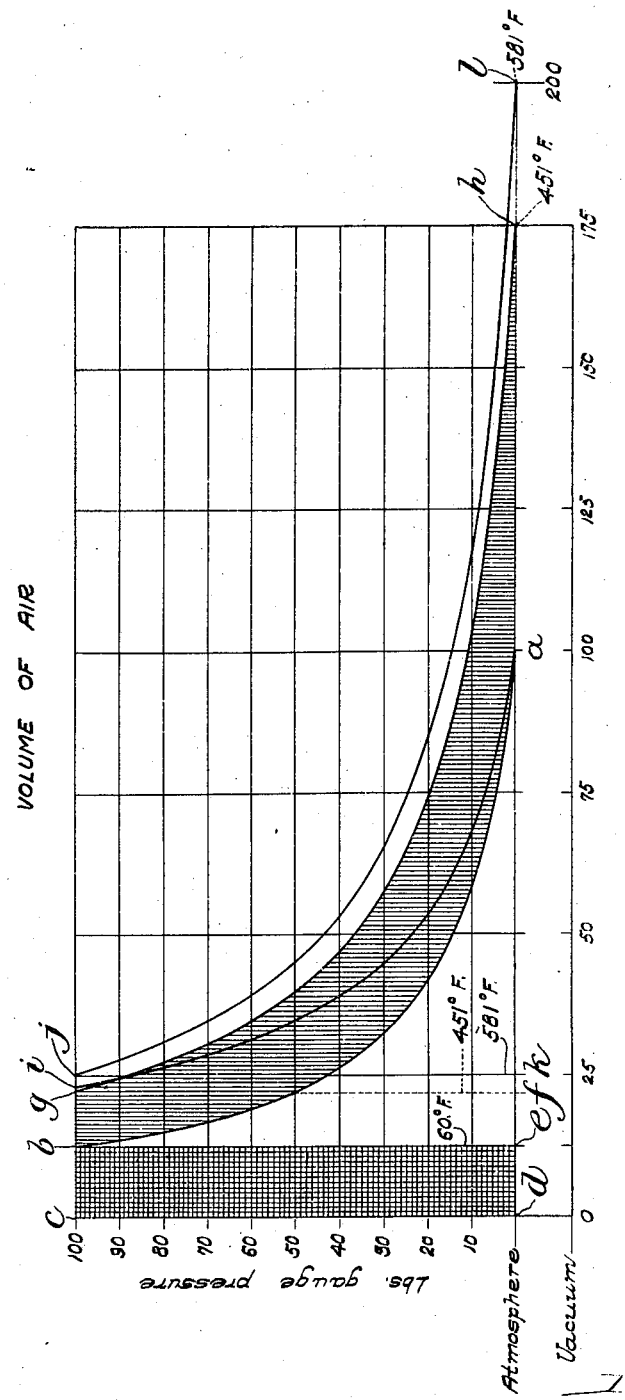

UNITED STATES PATENT OFFICE.

FOREST A. RAY, OF BOSTON, MASSACHUSETTS.

POWER-GENERATOR.

1,164,960.  Specification of Letters Patent.  Patented Dec. 21, 1915.

Application filed June 29, 1908.  Serial No. 440,812.

*To all whom it may concern:*

Be it known that I, FOREST A. RAY, of Boston, in the county of Suffolk and State of Massachusetts, have invented certain new and useful Improvements in Power-Generators, of which the following is a specification.

This invention relates to generators by which the potential energy contained in a combustible substance may be converted into mechanical work, and has for its object broadly to develop as great a proportion as possible of the heat value of the combustible substance or fuel into work with the least possible loss. In every engine or prime mover in which heat is a source of power, the purpose is of course to convert or transform the heat into mechanical motion, and the generator is more desirable in proportion as it is capable of transforming a greater part of the heat units delivered by the fuel into work, provided that its construction and nature are such that its greater efficiency is not offset by some objectionable feature which diminishes its commercial value. It is well known that the percentage of heat out of the entire amount given off by burning fuel which can be converted into power by any engine or generator now known or used, is not large in any case, and that in those which are commercially the most efficient, such as the steam-engine and boiler, and the internal combustion engine, the thermodynamic efficiency is very low. In the steam-engine, much of the heat of the fuel is used in supplying the latent heat of vaporization to the water, and this heat can never be recovered inasmuch as the working fluid must be exhausted at a temperature high enough to prevent its condensation, and in the internal combustion engine, mechanical considerations require an enormous percentage of heat to be carried off by the cooling agent and wasted in order to prevent deterioration of the cylinder.

It is my object to provide a motor and heater capable of utilizing and acting on a perfect gas as the working fluid, in which the latent heat losses are avoided and which may be used efficiently at a low enough temperature to eliminate danger of injury to the parts. Any gas may be used as the working fluid, those gases which can be obtained at the least cost being of course the ones preferably employed, and from this consideration, air is pre-eminently to be preferred.

I am well aware that various devices have been invented to use compressed or heated air, but it is the fact that none of such devices have been of much commercial value as prime movers, for various reasons, chief of which is that the hot air engine up to this time has had to work with too high a temperature of the air in order to get even a small amount of power, and this high temperature causes serious oxidation of certain parts of the engine and makes it difficult to keep the valves tight or to lubricate them. Again, such engines have no suitable or efficient means for heating air, as it does not enter the air-heating device from the compression chamber with the temperature at all approaching that of the atmosphere. Therefore the air cannot be caused to gather up its heat cumulatively from the fuel gases and absorb any considerable proportion of the heat contained therein, the remainder of the heat passing off of course with the products of combustion and being lost. Again, the amount of compression of the air used by such engines has in nearly every case been so small that it was necessary to make the engine excessively large to develop any material amount of power. Consequently, the hot-air engine as thus far developed, has lacked almost every element essential to make it efficient and has had an efficiency far below that of the steam engine or internal combustion motor.

The power generator which I have invented and which is described and claimed in the following specification, operates on a new principle, in that the air or other gas which is employed as the working fluid is compressed at practically uniform temperature, and is then heated in such a way as to absorb practically all of the heat given off by the fuel above the temperature of the atmosphere, and is then allowed to expand while doing work in substantially an isothermal manner, so as to perform the greatest possible amount of mechanical work. In being heated, the gas is not raised to a high enough temperature to do any harm to the parts of the power generator.

The essential parts of my invention are a compressor for the working fluid having cooling means to maintain its temperature constant during compression, a heater in which the working fluid is raised to the desired high temperature, and in which, while being heated, the working fluid absorbs the maximum quantity of heat from the fuel so that the products of combustion thereof passing into the stack at a temperature a little, if anything, higher than that of the atmosphere, and a motor in which the thus compressed and heated working fluid is allowed to expand and to perform work, such motor having provisions for circulating a part of the heating fluid so as to maintain the temperature of the expanding fluid at a nearly constant point, and thereby enable a greater amount of work to be performed than would be possible if the fluid were allowed to expand without receiving any additional heat.

Of the accompanying drawings,—Figure 1 represents a diagrammatic view of the entire generating apparatus or plant forming the substance of this invention. Fig. 2 represents a longitudinal sectional view of a compressor forming a part of the invention, for giving the required pressure to the working fluid at uniform temperature. Fig. 3 represents a horizontal section of part of the compressor, on line 3—3 of Fig. 2. Fig. 4 represents a longitudinal sectional view of a motor in which the compressed and heated fluid is caused to perform work. Fig. 5 represents a longitudinal sectional view of a heater. Fig. 6 represents a cross-sectional view of the same. Fig. 7 represents a longitudinal sectional view of a modified form of heater. Fig. 8 represents a cross-sectional view of the same. Fig. 9 represents a diagram illustrating a working cycle of the fluid.

The same reference characters indicate the same parts in all the figures.

Referring to Fig. 1, it will be seen that the essential parts of my power generator are a compressor 1, a tank or reservoir 2 in which the compressed fluid is stored, a heater 3 in which the compressed fluid is raised in temperature, and a motor 4 in which the fluid is caused to perform work.

Reciprocating motion is given by the expansion of the fluid to a piston rod 5 which acts through a connecting rod 6 upon a crank pin 7 which is fastened to a shaft 8, from which power may be taken by any well known means for any purpose.

Preferably the compressor and motor are connected together, as shown in Fig. 1, by means of a single rod 9 which is driven by the plunger of the motor. In this case the compressor and motor are arranged in tandem fashion, though they may equally well be arranged in parallel, and each connected with a separate connecting rod, as shown in Fig. 2, with the same shaft.

The internal construction of the compressor is shown in Fig. 2, which represents a single-acting compressor. This includes a trunk plunger 10 reciprocating through a stuffing-box 11 in the wall of a chamber 12 which contains a body of relatively light liquid, of a character, however, which is not particularly volatile and may remain in contact with air without appreciable evaporation.

Above the chamber 12 is a cooling chamber 13 bounded by the tube sheets 14 and 15. Into the latter are set a number of tubes 16 expanded at their ends in the usual manner so as to make tight joints with the sheets. These tubes open at their lower ends into the chamber 12 and at their upper ends into a clearance space 17. Thus there is communication between the tubes both at top and bottom. Inlet valves 18 and 19 open respectively into and out of the space 17. The valves are held in removable casings 20 of which the inlet valve is set into a chest 21 and the outlet valve in a chest 22. An intake pipe 23 leads to the chest 21 and an outlet pipe 24 from the chest 22. This compressor is shown as arranged to take air from the atmosphere and compress it, so the inlet pipe 23 is open to the surrounding air, but in case other gases are used, connection is made between the inlet pipe and any suitable supply of gas.

It will be observed that the reciprocations of the plunger 10 cause the fluid in the chamber 12 alternately to rise and recede in the tubes 16, and that during recession of the liquid, air is drawn through the inlet valve 18, which opens inwardly. As the plunger is forced into the chamber 12, the fluid rises and compresses the air in the tubes 16, and when the necessary pressure is raised, this air is expelled past the outwardly-opening valve 19 through the pipe 24 into the tank 2.

Light springs 25 and 27 surrounding the stems of the valves 18 and 19 and bearing against a wall 28 and plug 26 normally hold the inlet and discharge valves closed. Each of these valves is contained in a tubular casing which is set into the air chest and has a communication with the same. The valves are removable with the casings and can be removed therefrom by unscrewing the plug 26 of the one and the cap 29 of the other.

The liquid in the chamber 12 is preferably oil, although water or other suitable fluid may be used, and its office is to transmit the pressure from the plunger to the air or other gas to be compressed in the tubes 16, the columns of fluid in the tubes constituting pistons. The space in the chamber 13 around the tubes is filled with cooling liquid, such as water, which is admitted through the inlet pipe 30 and caused to take a sinuous path between and around the tubes by reason of the baffle plates 31 32, being expelled through the discharge pipe 33. The tubes are made of small diameter so as to divide the body of gas under compression into a large number of small volumes, and to provide a great conducting surface through which the heat may be communicated to the cooling liquid in chamber 13. By having the tubes very small, and supplying a sufficient amount of cooling water, the temperature of the gas may be kept at a practically constant temperature during the compression thereof, so that practically isothermal compression is accomplished and the gas is delivered into the tank 2 at practically the same temperature as that which it has when admitted to the compressor. When atmospheric air is the gas operated upon, it has approximately the same temperature as the surrounding atmosphere when delivered to the tank.

The construction of the motor is the same in principle as the compressor, except that in the form shown it is double-acting, whereas the compressor is single-acting. The motor, however, may be single-acting and the compressor may equally well be double-acting. The motor consists of two chambers 34 35 separated by a partition 36 through which a plunger 37 attached to the piston rod 5 reciprocates. The plunger is packed where it passes through the partition so that there is no flow of the liquid from one chamber to the other. Pressure-transmitting fluid of the same character as that in the compressor fills the chambers 34 and 35. Upper chambers 38 and 39 above the chambers 34 and 35 are partitioned off from the latter by a tube sheet 40, and are bounded above by a second tube sheet 41 in which are secured the ends of tubes 42. These tubes open into the liquid chambers in the same manner as has been described in connection with the compressor, and open at their tops into clearance spaces 43 44 which have ports leading to a valve chest 45. A valve of any appropriate character, such as the slide valve 46, is provided in the valve chest and operates so as to admit the working fluid alternately into the spaces 43 44 and thence to the tubes 42. The inlet to the valve chest is at 47, while the exhaust is at 48 and leads to an exhaust conduit 49. The valve is operated by an eccentric rod 50 through a bell-crank lever 51 and valve rod 52.

The operation of the motor will be readily understood. The working fluid under pressure being admitted under the control of the valve 46, first to one pressure chamber, and then to the other, acts through the tubes 42 to expel the columns of liquid in one set of tubes. This liquid flowing into the chamber beneath displaces the piston and causes the liquid to rise in the other set of tubes. Here, as in the compressor, the liquid serves to distribute the pressure from the gas to the plunger, and as controlled by the valve 46, moves the plunger back and forth, rotating the shaft in the ordinary manner through the connecting rod and crank.

It is to be understood that the compressor, if made double-acting, will have practically the same construction as the motor, the parts shown in Fig. 2 being duplicated, and the plunger arranged to pass through the partition between the two chambers 12.

As is the case with the compressor, the tubes 42 of the motor divide the working chambers thereof into small spaces containing relatively minute volumes of the working fluid, which are surrounded by intermediate spaces or interstices. These interstices are filled with gas at the same temperature as the working fluid when admitted to the motor, and this surrounding or jacketing gas is kept circulating through the inlet pipe 53 and outlet pipe 54 so as to maintain the temperature of the working fluid at practically a constant amount. By means of baffle plates 55 and 56, the jacketing gas is caused to follow a sinuous path among the tubes from top to bottom of the same, passing through holes 57 in the partition between the chambers 38 and 39.

I have described the compressor and motor as having tubes in which the working fluid is respectively compressed and caused to expand, such tubes communicating with the liquid-containing chambers at the lower part of the devices. It is to be understood, however, that the relative arrangement of tubes and interstices may well be reversed, the tubes being closed to the pressure-distributing liquid and to the clearance spaces, and connected with each other and with the inlets 30 53 and outlets 33 54, respectively so as to receive the cooling and heat-bearing fluids. The spaces intermediate the tubes will then be arranged so as to receive the pressure-transmitting liquid and the working fluid. In either case, however, the principle will be the same, the space containing the working fluid being sub-divided into a great number of smaller spaces, among which flows a fluid for carrying away the heat of compression and supplying heat in the motor to maintain an isothermal expansion of the working fluid.

One form of heater is shown in Fig. 5. It contains a combustion chamber 58 at the bottom of which is a grate 59 on which the fuel is burned. The products of combustion pass through perforations in a wall 60 and through the tubes 61 to a smoke-box 62, thence up a stack 63. Extending across the tubes and intermediate the tube sheets 64 and 65 are baffles 66 67. These baffles are plates through which the tubes pass which extend nearly across the space in which the tubes lie, terminating alternately near opposite points of the heater shell. The working fluid to be heated is carried from the tank 2 through a pipe 68 which enters the shell of the heater close to the rear of the tube sheet 65, and is thence caused to follow a sinuous path past the baffles 66 and 67 in the direction of the arrows until it reaches the front tube sheet 64. From the space between this sheet and the nearest baffle plate it is led by means of a pipe 69 to the motor. The course of this pipe is shown diagrammatically in Fig. 1. It opens into a tube 70 in which there is a thermostatic member 71 provided for a purpose to be described, and from the tube extends a connection 72. This connection divides into two branches, one of which is the inlet 47 which leads to the valve chest 45, while the other forms the inlet 53 which admits a part of the hot working fluid to the jacket spaces 38 and 39 around the tubes 42.

The outlet 54 from the jacket spaces leads to a pump 73 which maintains a circulation through the jacket and returns the gas through a pipe 74 to the heater. This pipe opens into the heater between two of the baffle plates at a point where the temperature of the products of combustion in the tubes 61 is nearly the same as that of the gas in the pipe.

The outlet conduit 49 from the motor exhaust opens into a two-part chamber 75 from which one pipe 76 leads to the space below the grate 59, while another pipe 77 leads to the combustion chamber of the heater above the fire. Thus part of the hot air exhausted from the motor passes through the fire to support the combustion thereof, and another part mingles directly with the products of combustion, and passes through the tubes where it gives up its heat to the incoming cool working fluid.

I find it convenient to provide an automatic regulation for maintaining the fire at approximately uniform intensity, and regulating the temperature of the products of combustion so that the working fluid will not be heated above a predetermined temperature, but will nevertheless be raised about to that temperature. This regulation is effected by a valve 78 in the chamber 75 which is moved one way or the other so as to restrict or increase the proportion of the exhaust air flowing through the pipes 76 and 77. This valve is connected with the thermostatic rod 71 through a lever 79, link 80 and rod 81. The thermostatic rod is secured at one end in the tubular casing 70 and passes through the other end of this casing, being exposed through the greater part of its length to the hot working fluid from the tube 69. When the temperature of this gas becomes too high, the rod 71 is expanded and the valve 78 moved so as to shut off more or less the supply of the air which is delivered under the grate, and to increase the amount of air delivered above the fire, while when the fire becomes low and the temperature drops, the rod 71 contracts, and the greater proportion of air is blown through the fire to raise the temperature thereof, and a less amount of the cooler exhaust fluid is delivered from the pipe 77.

From the foregoing it will be understood that the air is delivered from the compressor to the tank practically at atmospheric temperature, and that it enters the heater at this same temperature. The entrance of the cool air is at that part of the heater where the furnace gases are discharged, so that the coolest incoming air is in heat-receiving relation with the coolest outflowing gases. The course of the working fluid is then opposite to that of the outflowing flue gases, and as it becomes hotter, approaches the furnace, thereby absorbing heat cumulatively. By regulating the flow of the working fluid, and the furnace gases, the temperature of the latter when they come into the stack may be made nearly as low as the outer atmosphere, so that approximately all of the available heat delivered by the fuel may be utilized. At the same time, the heat remaining in the working fluid after having been expanded to do work, is utilized both directly to heat the incoming working fluid (by being discharged from the pipe 77 into the flues with the products of combustion), and indirectly by being delivered at a high temperature to support the combustion of the fuel, thereby delivering its heat to the fire.

That proportion of the working fluid which is diverted through the pipe 53 and jackets 38 39 of the motor is continuously circulated by the pump 73, being re-heated immediately after passing from the jackets. In being re-heated, it mingles with the incoming working fluid and again flows from the heater through the pipe 69. Thus a constant flow of the working fluid at the same temperature as that in the tubes 42 is provided so as to surround the small volumes into which the working chamber is divided, and thus the temperature of the working fluid is maintained approximately constant. This provides for nearly isothermal expansion of the air.

The diagram in Fig. 9 illustrates the manner in which the working fluid is compressed and expanded. In the diagram the ordinates represent the pressure in pounds above the atmosphere, and the abscissæ represent volumes. It is assumed for the present illustration that 100 volumes of air are taken into the compressor from the atmosphere at a temperature of 60° Fah., and are then compressed. The curved line $a$—$b$ represents the isothermal compression which takes place in the compressor by reason of the fact that the heat of compression is carried away by the cooling fluid as fast as it is developed. At the end of the compression, the 100 volumes of air at atmospheric temperature are compressed to 12 volumes of air at 100 pounds pressure, represented by the space $b\ c\ d\ e$ of the diagram. Upon being heated to a temperature of 451°, the fluid expands to the volume represented by the line $f$—$g$, and then being allowed to expand in the motor while heat is supplied to maintain its temperature. Its condition during expansion is represented by the curved line $g$—$h$. This represents the expansion carried completely down to the pressure of the atmosphere. By reason of the heat supplied by the jacketing fluid in the motor, the volume is increased 75%, and the work done by the heat so supplied is represented by the area between the line $a$—$b$ and the line $g$—$h$. If the air were compressed without extraction of heat, that is, adiabatically, its pressure curve would be the line $a$—$i$, having at 100 pounds pressure a temperature of slightly more than 451°. The space on the diagram between the adiabatic line $a$—$i$ and the isothermal line $a$—$b$ represents the work of which the compressor is relieved by the cooling of the air during compression, and also the additional capacity for performing work which is supplied by the heating of the air in the heater. If after being isothermally compressed and heated the air were allowed to expand adiabatically in the motor, the fall of pressure would be along the line $i$—$a$ to the original volume, and the effective work done would be represented by the area $a\ b\ g$. By supplying additional heat in the motor while work is being done therein so as to effect substantially isothermal expansion, a greater amount of work, represented by the area $a\ g\ h$ is performed. The total work is represented by the area $a\ b\ g\ h\ a$. This is the greatest possible theoretic efficiency where an isothermal compression at a low temperature is effected and isothermal expansion at a high temperature is caused.

By my construction of engine and compressor, the theoretical maximum is closely approximated, for both the compression and expansion are as nearly isothermal as they can be possibly made. The line $j\ k$ represents the volume at 100 pounds pressure when the temperature of the air is raised in the heater to 581°. Isothermal expansion then to atmospheric pressure is carried to the point $l$ and doubles the original volume of air. In practice the liquid which is used in the motor is a thin oil which will not volatilize until about 600° Fah. or a somewhat warmer temperature, so that a temperature as high as that indicated in the diagram is practically feasible. In addition, suitable governing means may be provided for regulating the speed of the engine.

The modified form of heater shown in Figs. 7 and 8 differs from that of Figs. 5 and 6 in that the working fluid while being heated, travels through a coil 82 instead of through a number of chambers separated by baffles. In this latter form the furnace gases follow a sinuous path back and forth through the convolutions of the coil being deflected alternately by the internal baffle plates 83 and the external plates 84 which obstruct respectively the spaces within and without the coil. These plates and the coil are supported by the longitudinal bars 85 and 86.

By reference to Figs. 1, 5 and 7, it will be noted that the air which passes through the heater and is warmed by the fuel gases ultimately serves to support the combustion, for this air passes through the pipe 69 to the motor, and thence into the pipe 76 which supplies the air for the support of combustion. Thereby the heat of the waste products of combustion is utilized in maintaining a high temperature of combustion of the fuel.

I claim:

1. An engine, comprising a compressor adapted to act on an elastic fluid and constructed so that the body of fluid being compressed is subdivided into a number of small parts, provisions for abstracting the heat of compression from all the subdivisions of the fluid, a heater by which the temperature of the compressed fluid is raised, a motor in which the compressed and heated fluid is caused to expand and perform work, and means for conducting the expanded fluid to the heater to supply a hot blast for the fuel.

2. A power generator comprising a compressor adapted to act on an elastic fluid, means for subdividing the fluid undergoing compression into a multiplicity of small volumes, means for circulating cooling fluid in thermal contact with such volumes to carry away the heat of compression and maintain the temperature approximately constant, a heater for raising the temperature of such fluid at constant pressure, a motor in which the fluid is caused to expand and perform work, having spaces for working fluid and spaces for heat-supplying fluid, and means for dividing said fluid and causing different parts thereof to pass into different spaces.

3. An apparatus for converting heat energy into mechanical work, comprising a compressor adapted to act on an elastic fluid and having provisions for maintaining the entire volume of the fluid approximately at constant temperature during the compression, a heater to raise the temperature of the fluid, and a motor in which the fluid is caused to expand and perform work by direct pressure, having provisions for causing the temperature of the entire volume of the fluid to be maintained throughout the expansion approximately at the higher temperature, by thermal contact with part of the compressed heated fluid.

4. An apparatus for converting heat energy into mechanical work, comprising means for compressing an elastic working fluid and at the same time extracting the heat of compression from all parts of the body of fluid under compression, means for raising the temperature of the fluid, a motor in which the working fluid is caused to expand, and provisions for causing an unexpanded portion of the heated fluid to impart heat to the working fluid to maintain its temperature approximately at the high point during the expansion thereof.

5. An apparatus for converting heat energy into mechanical work, comprising means for compressing an elastic working fluid and at the same time extracting therefrom the heat of compression, means for raising the temperature of the fluid, a motor in which the working fluid is caused to expand, provisions for causing a portion of the same heated fluid to impart heat to the working fluid to maintain its temperature approximately at the high point during the expansion thereof, and provisions for transferring the heat of the exhausted fluid to the cool compressed fluid prior to the expansion thereof in the motor.

6. A power installation comprising, a compressor having a large radiating surface of greater area than that of its inclosing walls, in contact with which an elastic working fluid is compressed, means for circulating a cooling medium in contact with such surface to maintain the temperature of the working fluid approximately constant, a heater in which the temperature of the fluid is raised by extraneous heating means; an expansion motor into which the fluid is conducted from the heater, and a space partitioned off from the working chamber of the motor by conducting walls, through which space a part of the heated fluid is caused to flow from the heater, whereby the temperature of the fluid in the working chamber is maintained approximately constant while expanding.

7. A power installation comprising a compressor having a large radiating surface, in contact with which an elastic working fluid is compressed, means for circulating a cooling medium in contact with such surface to maintain the temperature of the working fluid approximately constant; a heater having passages through which the compressed fluid is caused to flow oppositely to and across, but never parallel with, the current of a heating medium passing from a source of heat, thereby absorbing heat cumulatively from such medium, a motor having a working chamber in which the fluid is caused to act expansively, and means for leading the expanded fluid from said chamber and causing it to deliver its heat to the working fluid prior to expansion of the latter.

8. A power installation comprising a compressor having a large radiating surface, in contact with which an elastic working fluid is compressed, means for circulating a cooling medium in contact with such surface to maintain the temperature of the working fluid approximately constant, a heater having passages through which the compressed fluid is caused to flow progressively toward a source of heat in general opposition to, and never parallel with, the current of a heating medium passing from said source of heat, thereby absorbing heat cumulatively from such medium, a motor having a working chamber in which the fluid is caused to act expansively, and means for leading the expanded fluid from said chamber to the heater and causing it to mingle with the heating medium therein, whereby its heat is delivered to the unexpanded working fluid.

9. A power generator comprising a compressor having a pressure chamber partitioned off into a number of small separated spaces with provisions for circulating a cooling fluid through the interstices between such spaces, whereby an elastic working fluid may be compressed at substantially uniform temperature, a heater having a fire space and passages for the products of combustion and for the compressed working fluid separated by conducting walls and arranged so that the working fluid may flow oppositely to the products of combustion so as to absorb heat cumulatively, and a motor having an expansion chamber subdivided by heat-conducting partitions into a large number of chambers, into which the heated compressed working fluid is admitted, and in the interstices between which a part of the heated working fluid is caused to circulate, whereby a substantially isothermal expansion of the working fluid in the expansion chamber is effected.

10. A power generator comprising a compressor having a pressure chamber partitioned off into a number of small separated spaces with provisions for circulating a cooling fluid through the interstices between such spaces, whereby an elastic working fluid may be compressed at substantially uniform temperature, a heater having a fire space and passages for the products of combustion and for the compressed working fluid separated by conducting walls and arranged so that the working fluid may flow oppositely to the products of combustion so as to absorb heat cumulatively, a motor having an expansion chamber subdivided by heat-conducting partitions into a large number of chambers, into which the heated compressed working fluid is admitted, and in the interstices between which a part of the heated working fluid is caused to circulate, whereby a substantially isothermal expansion of the working fluid in the expansion chamber is effected, and an exhaust conduit arranged to discharge the exhaust from said motor where it will mingle with the products of combustion and heat the working fluid.

11. A power generator comprising a compressor having a pressure chamber partitioned off into a number of small separated spaces with provisions for circulating a cooling fluid through the interstices between such spaces, whereby an elastic working fluid, such as air, may be compressed at substantially uniform temperature, a heater having a fire space and passages for the products of combustion and for the compressed working fluid separated by conducting walls and arranged so that the working fluid may flow oppositely to the products of combustion so as to absorb heat cumulatively, a motor having an expansion chamber subdivided by heat-conducting partitions into a large number of chambers, into which the heated compressed working fluid is admitted, and in the interstices between which a part of the heated working fluid is caused to circulate, whereby a substantially isothermal expansion of the working fluid in the expansion chamber is effected, and an exhaust conduit arranged to discharge the working fluid from said motor beneath the fire, to supply air for combustion and to transfer the heat of the exhaust to the products of combustion and therefrom to the working fluid.

12. A power generator comprising a compressor having a pressure chamber partitioned off into a number of small separated spaces with provisions for circulating a cooling fluid through the interstices between such spaces, whereby an elastic working fluid, such as air, may be compressed at substantially uniform temperature, a heater having a fire space and passages for the products of combustion and for the compressed working fluid separated by conducting walls and arranged so that the working fluid may flow oppositely to the products of combustion so as to absorb heat cumulatively, a motor having an expansion chamber subdivided by heat-conducting partitions into a large number of chambers, into which the heated compressed working fluid is admitted, and in the interstices between which a part of the heated working fluid is caused to circulate, whereby a substantially isothermal expansion of the working fluid in the expansion chamber is effected, and a divided conduit arranged to conduct away the expanded working fluid from said motor and discharge a part thereof beneath the fire and the remainder back of the fire where it mingles with the products of combustion, whereby air at high temperature for supporting combustion is furnished, and the heat of the exhaust is transferred to the incoming compressed working fluid.

13. A power generator comprising a compressor having a pressure chamber partitioned off into a number of small separated spaces with provisions for circulating a cooling fluid through the interstices between such spaces, whereby an elastic working fluid, such as air, may be compressed at substantially uniform temperature, a heater having a fire space and passages for the products of combustion and for the compressed working fluid separated by conducting walls and arranged so that the working fluid may flow oppositely to the products of combustion so as to absorb heat cumulatively, a motor having an expansion chamber subdivided by heat-conducting partitions into a large number of chambers, into which the heated compressed working fluid is admitted, and in the interstices between which a part of the heated working fluid is caused to circulate, whereby a substantially isothermal expansion of the working fluid in the expansion chamber is effected, a divided conduit arranged to conduct away the expanded working fluid from said motor and discharge a part thereof beneath the fire and the remainder back of the fire where it mingles with the products of combustion, whereby air at high temperature for supporting combustion is furnished, and the heat of the exhaust is transferred to the incoming compressed working fluid, and a valve governed by the heat of the working fluid for regulating the proportion of the exhaust delivered from the different outlets.

14. A power generator comprising a motor having a chamber in which a compressed elastic working fluid is adapted to act expansively, means for circulating a portion of the working fluid around and through the interior of the chamber, and provisions for heating and re-heating the same, whereby external heat is supplied continuously to the working fluid and approximately isothermal expansion obtained.

15. A power generator comprising a motor consisting of a chamber in which an elastic working fluid is adapted to act expansively, said chamber being divided into a large number of separated spaces, provisions for circulating a heat-carrying fluid among such spaces for the purpose of maintaining the temperature of the working fluid at an approximately uniform amount during the expansion thereof, and means for heating such circulating fluid.

16. A power generator comprising a motor having a chamber in which a compressed elastic working fluid is adapted to act expansively, a heating apparatus through which the fluid is conducted on its way to the motor, and provisions for passing the exhaust fluid from the motor into said heating apparatus; said apparatus being divided into a number of separated channels and tortuous passages through which the incoming and outgoing currents are caused to flow in thermal contact, but out of actual contact, whereby the waste heat of the exhaust is utilized to heat the working fluid.

17. A power generator comprising a compressor constructed and arranged to impart pressure to a working fluid, means for circulating a cooling fluid in thermal contact with all parts of the body of working fluid being compressed, whereby an increase of pressure in the latter at substantially uniform temperature is accomplished, a heater by which the compressed fluid is raised in temperature while remaining at constant pressure, a motor in which the heated fluid is caused to perform work by expansion, and means for conveying a portion of the fluid having the initial temperature of that performing work in the motor in thermal contact with all parts of the body of working fluid undergoing expansion to maintain the temperature of the latter at a constant point, whereby isothermal expansion is accomplished.

18. A power generator comprising a compressor for taking the atmospheric air and increasing its pressure to a predetermined amount, a means for extracting the heat of compression from the air, a heater through which the compressed air is passed while remaining at constant pressure, whereby heat energy is imparted thereto, a motor having a working chamber subdivided into a multiplicity of small volumes into which the working fluid is conducted from the heater, and a branch for conducting a portion of the heated fluid into heat-transferring relations with such volumes, such portion of the fluid being circulated through the heater and motor.

19. In an apparatus of the character described, the combination of a chamber containing liquid, a plunger arranged to move inwardly and outwardly through a wall of such chamber so as to displace the liquid, a plurality of compartments communicating with the interior of said chamber, whereby to admit the fluid displaced therefrom by the plunger, and being all in communication with one another at a level higher than that of the displaced liquid, said compartments being so separated from one another as to provide intermediate spaces, and means for conducting a heat transferring fluid into, through, and away from such spaces.

20. In an apparatus of the character described the combination of a chamber containing liquid, a plunger arranged to move inwardly and outwardly through a wall of such chamber so as to displace the liquid, a plurality of tubes communicating with said chamber and rising from the top thereof, a chest into which the upper portions of said tubes open, a casing inclosing the tubes, said tubes being contained in said casing with spaces between them, and means for conducting circulating heat-transferring fluid into and out of said casing and such spaces.

In testimony whereof I have affixed my signature, in presence of two witnesses.

FOREST A. RAY.

Witnesses:
P. W. PEZZETTI,
A. C. RATIGAN.

Copies of this patent may be obtained for five cents each, by addressing the "Commissioner of Patents Washington, D. C."